US010544826B1

(12) United States Patent
Lee

(10) Patent No.: US 10,544,826 B1
(45) Date of Patent: Jan. 28, 2020

(54) TURBOCHARGER INCLUDING A BEARING HAVING AN OIL SUPPLY STRUCTURE

(71) Applicants: HYUNDAI MOTOR COMPANY, Seoul (KR); KIA MOTORS CORPORATION, Seoul (KR)

(72) Inventor: Su Ho Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/360,888

(22) Filed: Mar. 21, 2019

(30) Foreign Application Priority Data

Nov. 19, 2018 (KR) ........................ 10-2018-0142942

(51) Int. Cl.

| | |
|---|---|
| ***F16C 17/10*** | (2006.01) |
| ***F01D 25/16*** | (2006.01) |
| ***F02B 39/14*** | (2006.01) |
| ***F01D 25/18*** | (2006.01) |

(52) U.S. Cl.
CPC .............. *F16C 17/10* (2013.01); *F01D 25/16* (2013.01); *F01D 25/18* (2013.01); *F02B 39/14* (2013.01); *F16C 2360/24* (2013.01)

(58) Field of Classification Search
CPC ...... F16C 17/10; F16C 17/102; F16C 17/107; F16C 17/18; F16C 2360/24; F01D 25/16; F01D 25/166; F01D 25/18; F02B 39/14
See application file for complete search history.

(56) References Cited

U.S. PATENT DOCUMENTS

| | | | | |
|---|---|---|---|---|
| 3,625,576 A * | 12/1971 | Miller | F01D 25/186 | 384/397 |
| 3,993,370 A * | 11/1976 | Woollenweber | F01D 25/166 | 384/287 |
| 5,169,242 A * | 12/1992 | Blase | F01D 25/164 | 384/107 |
| 6,709,160 B1 * | 3/2004 | Ward | F01D 25/166 | 384/286 |
| 2005/0047690 A1 * | 3/2005 | Keramati | F01D 25/168 | 384/368 |
| 2007/0003175 A1 * | 1/2007 | Petitjean | F01D 25/16 | 384/322 |
| 2011/0108636 A1 * | 5/2011 | Wright | B05B 3/002 | 239/251 |
| 2011/0120125 A1 * | 5/2011 | Castan | F02C 6/12 | 60/605.3 |
| 2011/0176907 A1 * | 7/2011 | Groves | F01D 25/166 | 415/1 |
| 2012/0237149 A1 * | 9/2012 | Uesugi | F01D 25/166 | 384/397 |
| 2013/0236336 A1 * | 9/2013 | Koerner | F01D 25/16 | 417/406 |
| 2018/0252265 A1 * | 9/2018 | Uneura | F01D 25/166 | |

FOREIGN PATENT DOCUMENTS

KR 1020110117970 10/2011

* cited by examiner

*Primary Examiner* — Alan B Waits
(74) *Attorney, Agent, or Firm* — Lempia Summerfield Katz LLC

(57) ABSTRACT

A turbocharger includes a bearing having an oil supply structure in which lubricating oil introduced into a journal bearing is smoothly supplied to thrust bearing units provided at the journal bearing, thereby securing stable formation of an oil film and consequently preventing damage to the thrust bearing units and reducing the occurrence of noise and vibration.

2 Claims, 3 Drawing Sheets

200 230 P 210 220 230 221 260 240 240 230 220 220 230

TURBOCHARGER INCLUDING A BEARING HAVING AN OIL SUPPLY STRUCTURE

CROSS-REFERENCE TO RELATED APPLICATION

This application claims the priority benefit of Korean Patent Application No. 10-2018-0142942, filed on Nov. 19, 2018 in the Korean Intellectual Property Office, the disclosure of which is incorporated herein by reference.

BACKGROUND

1. Field of the Disclosure

The present disclosure relates to a turbocharger including a bearing having an oil supply structure that is capable of preventing damage to a product by causing oil to be smoothly supplied to thrust bearing pads.

2. Description of the Related Art

A turbocharger has been widely used in internal combustion engines, particularly in engines for heavy-duty trucks or ships. Recently, a turbocharger has also become more commonly used for passenger cars in order to obtain high power from small engines. Such a turbocharger improves the quality of exhaust gas by realizing more complete combustion of fuel.

A turbocharger includes a turbine configured to be rotated by exhaust gas and a compressor configured to be rotated by the turbine to compress intake air. The turbine and the compressor are connected to each other via a shaft.

The shaft is rotatably installed in a center housing via a journal bearing and a thrust bearing. Recently, a turbocharger has been developed in which a journal bearing and a thrust bearing are integrated in order to reduce the number of parts.

To this end, the journal bearing is provided with a thrust bearing pad and an oil supply groove, through which oil is supplied to the thrust bearing pad. However, in the related art, because the oil supply groove is formed inside the journal bearing, an oil film is unstably formed, resulting in severe vibration when the turbocharger operates.

Further, because the extent to which the size of the oil supply groove can be increased inside the journal bearing is limited, it is difficult to supply a sufficient amount of oil to the thrust bearing pad.

The information disclosed in this Background section is only to enhance understanding of the general background of the disclosure. The information should not be taken as an acknowledgement or as any form of suggestion that this information forms the prior art already known to a person of ordinary skill in the art.

SUMMARY

Therefore, the present disclosure has been made in view of the above problems. It is an object of the present disclosure to provide a turbocharger including a bearing having an oil supply structure that is capable of preventing damage to a product by causing oil to be smoothly supplied to thrust bearing pads.

In accordance with the present disclosure, the above and other objects can be accomplished by the provision of a turbocharger including a bearing having an oil supply structure. The turbocharger includes a center housing including a bearing installation portion formed therein and an oil supply passage communicating with the bearing installation portion to supply oil. The turbocharger includes a journal bearing provided in the bearing installation portion. The journal bearing has a hollow region therein through which a shaft passes. The shaft is rotatably installed in the center housing. A through-hole communicates with the oil supply passage and an oil supply hole extends from the inner circumferential surface thereof to an end surface of an end portion thereof.

The journal bearing may include support portions protruding from both end portions thereof toward the hollow region thereof to support the shaft.

The journal bearing may be spaced apart at the middle portion thereof from the shaft. An oil flow passage may be defined by a space between the middle portion of the journal bearing and the shaft. The oil supply hole may extend from a connection point between each of the support portions and the oil flow passage to the end surface of the end portion of the journal bearing.

The turbocharger may further include thrust bearing units provided on the end surface of the end portion of the journal bearing while being arranged to be spaced apart from each other. The oil supply hole may be formed as a plurality of oil supply holes so as to penetrate the thrust bearing units in one-to-one correspondence.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE EMBODIMENTS

Hereinafter, a turbocharger including a bearing having an oil supply structure according to an embodiment of the present disclosure is described in detail with reference to the accompanying drawings.

Figure 1:
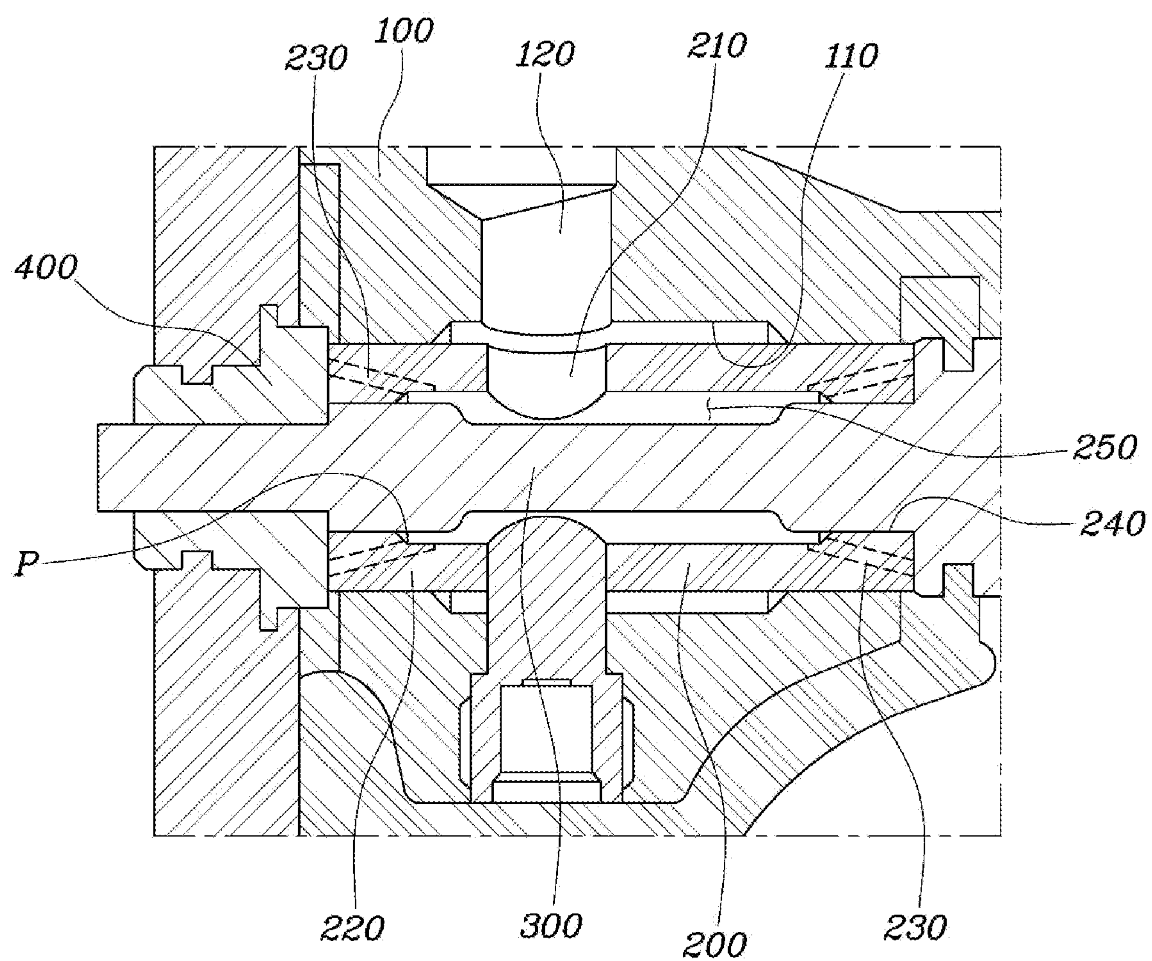
FIG. 1 is a view showing a turbocharger including a bearing having an oil supply structure according to an embodiment of the present disclosure.
Figure 2:
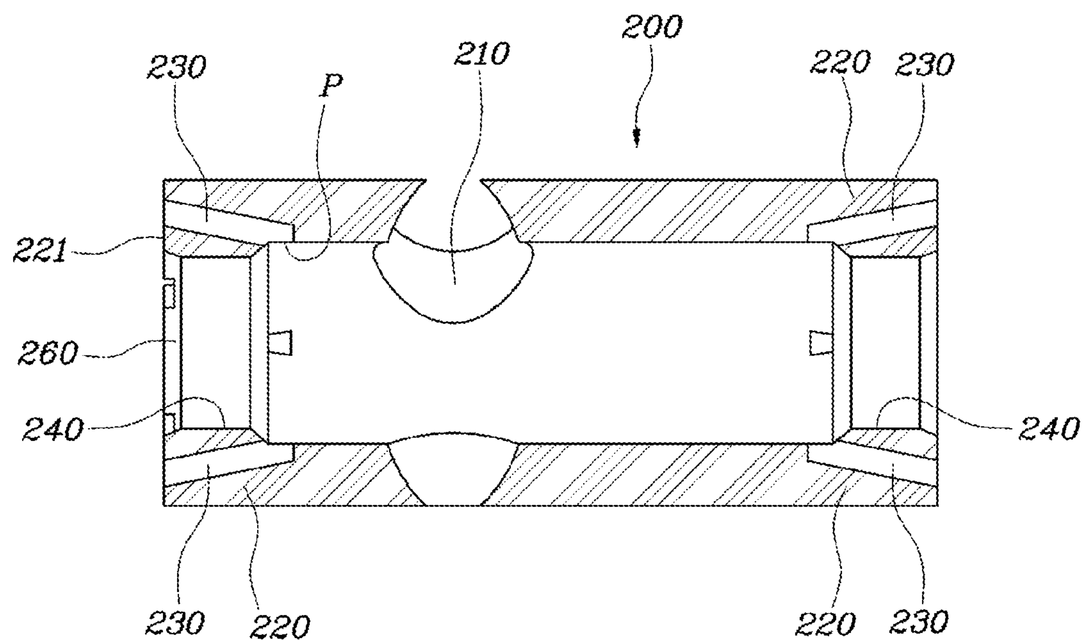
FIGS. 2 and 3 are views showing, in detail, the turbocharger including a bearing having an oil supply structure shown in FIG. 1.
Figure 3:
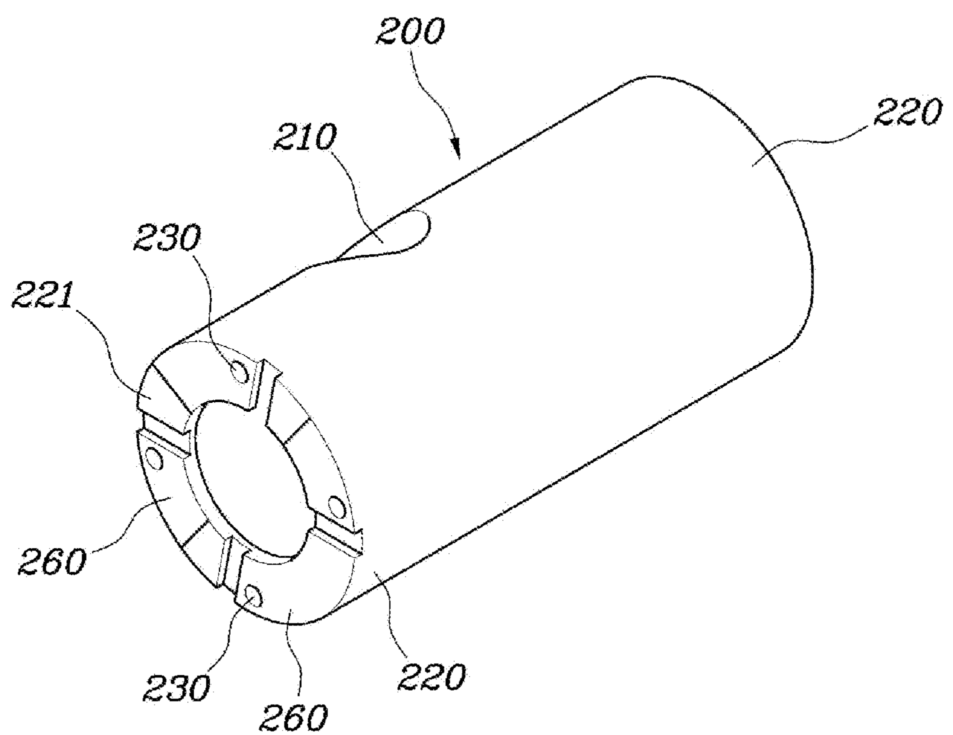

FIG. 1 is a view showing a turbocharger including a bearing having an oil supply structure according to an embodiment of the present disclosure, FIGS. 2 and 3 are views showing, in detail, the turbocharger including a bearing having an oil supply structure shown in FIG. 1.

As shown in FIG. 1, the turbocharger including a bearing having an oil supply structure according to the present disclosure includes a center housing 100. The housing 100 includes a bearing installation portion 110 formed therein and an oil supply passage 120 communicating with the bearing installation portion 110 to supply oil. A journal bearing 200 is provided in the bearing installation portion 110 and has a hollow region therein. A shaft 300 is rotatably installed in the center housing 100 and passes through the hollow region. A through-hole 210 communicates with the oil supply passage 120 and an oil supply hole 230 extends from the inner circumferential surface thereof to an end surface 221 of an end portion 220 thereof.

As shown in FIG. 1, the shaft 300 is rotatably installed in the center housing 100 while penetrating the bearing installation portion 110. The oil supply passage 120 is formed in the center housing 100 in order to supply lubricating oil to the shaft 300. The center housing 100 may be provided with a deflector 400 for preventing the leakage of oil. An oil ring may be provided between the deflector 400 and the center housing 100.

The journal bearing 200 is provided in the bearing installation portion 110 of the center housing 100 in order to rotatably surround the shaft 300 and to lubricate the shaft 300 by supplying lubricating oil to the shaft 300 through the through-hole 210. The through-hole 210 is formed therein so as to communicate with the oil supply passage 120. Particularly, the oil supply hole 230 extends from the inner circumferential surface of the hollow journal bearing 200 to the end surface 221 of the end portion 220 of the journal bearing 200. Thus, the internal hollow region in the journal bearing 200 and the end surface 221 of the end portion 220 of the journal bearing 200 communicate with each other. Accordingly, the lubricating oil is also smoothly supplied to the end surface 221.

In the related art, a groove is formed in the inner circumferential surface of a journal bearing. The groove extends to the end portion of the journal bearing in order to supply lubricating oil to the end surface of the end portion. However, in this configuration, the lubricating oil in the journal bearing is locally supplied only to the circumferential portion of a shaft, whereby an oil film is unstably formed on the end surface of the journal bearing. Particularly, a thrust bearing unit is disposed on the end surface of the journal bearing. Prevention of abrasion of the thrust bearing unit and prevention of damage thereto depend on lubrication performance. However, in the related art, because the end surface of the journal bearing is not sufficiently lubricated, the thrust bearing unit is easily damaged.

Therefore, according to the present disclosure, the oil supply hole 230 extends from the inner circumferential surface of the journal bearing 200 to the end surface 221 of the end portion 220 of the journal bearing 200. Thus, the lubricating oil, which is introduced into the journal bearing 200 via the through-hole 210 from the oil supply passage 120 in the center housing 100, flows to the end surface 221 of the end portion 220 via the oil supply hole 230, thereby sufficiently lubricating the end surface 221. Accordingly, an oil film is stably formed on the end surface 221 of the journal bearing 200, thereby sufficiently lubricating thrust bearing units 260 provided on the end surface 221. In addition, since a groove that is commonly formed in the related art is eliminated, the journal bearing 200 is in contact with the shaft 300, thereby stably supporting the shaft 300.

Described in greater detail, the journal bearing 200 may include support portions 240 protruding from both end portions 220 of the journal bearing 200 toward the internal hollow region thereof in order to support the shaft 300. The support portions 240 of the journal bearing 200 surround and support the shaft 300. Thus, the shaft 300 is stably received and rotated in the journal bearing 200. In addition, because a groove, which was formed in the prior art, is eliminated, the support portions 240 of the journal bearing 200 and the shaft 300 are in surface contact with each other, thereby achieving smooth rotation of the shaft 300 due to stable formation of an oil film.

Since the support portions 240 are formed at both end portions 220 of the journal bearing 200, the middle portion of the journal bearing 200 is spaced apart from the shaft 300, and an oil flow passage 250 is defined by the space between the middle portion of the journal bearing 200 and the shaft 300. The oil flow passage 250 communicates with the through-hole 210 formed in the journal bearing 200. The lubricating oil supplied from the oil supply passage 120 in the center housing 100 is therefore introduced into the oil flow passage 250. Accordingly, the lubricating oil flows through the oil flow passage 250 formed between the journal bearing 200 and the shaft 300 and lubricates the shaft 300. The lubricating oil may flow in the longitudinal direction of the shaft 300.

Particularly, as shown in FIGS. 1 and 2, the oil supply hole 230 may extend from a connection point P, which is between each of the support portions 240 and the oil flow passage 250, to the end surface 221 of the end portion 220 of the journal bearing 200. As such, since the oil supply hole 230 extends from the connection point P between each of the support portions 240 and the oil flow passage 250, the lubricating oil introduced into the journal bearing 200 flows along the oil flow passage 250 and lubricates the shaft 300. In addition, since the oil supply hole 230 extends to the end surface 221 of the journal bearing 200, the lubricating oil is directly supplied to the end surface 221, and an oil film is stably formed on the end surface 221, thereby reducing friction and abrasion.

In other words, the lubricating oil flowing along the oil flow passage 250 formed between the journal bearing 200 and the shaft 300 sufficiently lubricates the shaft 300. The lubricating oil then moves to the end surface 221 of the journal bearing 200 via the oil supply hole 230. Since the lubricating oil is directly supplied to the end surface 221, lubrication performance with respect to the end surface 221 is assured.

As shown in FIG. 3, thrust bearing units 260 are provided on the end surface 221 of the end portion 220 of the journal bearing 200. The thrust bearing units 260 serve to support the shaft 300 in the axial direction. The thrust bearing units 260 are arranged on the end surface 221 of the journal bearing 200 and are spaced apart from each other in the circumferential direction of the journal bearing 200. The thrust bearing units 260 may be integrally coupled to the end surface 221 of the journal bearing 200.

The oil supply hole 230 formed in the journal bearing 200 may be provided in a plural number, i.e., as a plurality of the oil supply holes 230, so as to correspond to the number of thrust bearing units 260. Each of the oil supply holes 230 may extend so as to penetrate a corresponding one of the thrust bearing units 260. As a result, all of the thrust bearing units 260 are sufficiently lubricated.

Since the oil supply holes 230 formed in the journal bearing 200 extend so as to penetrate the thrust bearing units 260, the lubricating oil is supplied to the thrust bearing units 260 via the oil supply holes 230, thereby reducing abrasion of the thrust bearing units 260.

As is apparent from the above description, the turbocharger includes a bearing having an oil supply structure configured as described above. Accordingly, lubricating oil introduced into a journal bearing is smoothly supplied to thrust bearing units provided at the journal bearing, thereby securing stable formation of an oil film. Consequently, damage to the thrust bearing units is prevented and the occurrence of noise and vibration is reduced.

Although an embodiment of the present disclosure has been disclosed for illustrative purposes, those having ordinary skill in the art will appreciate that various modifications, additions and substitutions are possible, without departing from the scope and spirit of the disclosure as disclosed in the accompanying claims.

What is claimed is:

1. A turbocharger including a bearing having an oil supply structure, the turbocharger comprising:

a center housing having a bearing installation portion formed therein and an oil supply passage communicating with the bearing installation portion to supply oil; and a journal bearing provided in the bearing installation portion, the journal bearing having a hollow region therein through which a shaft passes, the shaft being rotatably installed in the center housing, the journal bearing having a through-hole communicating with the oil supply passage and having an oil supply hole extending from an inner circumferential surface thereof to an end surface of an end portion thereof, wherein the journal bearing comprises support portions protruding from both end portions thereof toward the hollow region thereof to support the shaft, wherein the journal bearing is spaced apart at a middle portion thereof from the shaft, wherein an oil flow passage is defined by a space between the middle portion of the journal bearing and the shaft, and wherein the oil supply hole extends from a connection point between each of the support portions and the oil flow passage to the end surface of the end portion of the journal bearing.

2. The turbocharger according to claim 1, further comprising:

thrust bearing units provided on the end surface of the end portion of the journal bearing, the thrust bearing units arranged so as to be spaced apart from each other, wherein the oil supply hole includes a plurality of the oil supply holes so as to penetrate the thrust bearing units.

* * * * *